United States Patent [19]  [11] 3,896,166
Kaiser et al.  [45] July 22, 1975

[54] FORMYL-SUBSTITUTED TYROSINE

[75] Inventors: Ado Kaiser, Lausen, Switzerland;
Hermann Bretschneider; Kraft
Hohenlohe-Oehringen, both of
Innsbruck, Austria

[73] Assignee: Hoffmann-La Roche Inc., Nutley, N.J.

[22] Filed: June 27, 1973

[21] Appl. No.: 374,146

Related U.S. Application Data

[63] Continuation-in-part of Ser. No. 139,297, April 28, 1971, Pat. No. 3,763,218.

[30] Foreign Application Priority Data

May 6, 1970  Switzerland.......................... 6806/70

[52] U.S. Cl....... 260/519; 260/471 A; 260/570.8 R; 424/309; 424/330
[51] Int. Cl.²...................................... C07C 103/30

[58] Field of Search.......... 260/471 A, 519, 570.8 R

[56] References Cited
OTHER PUBLICATIONS
Theilheimer, W., Synthetic Methods of Organic Chemistry, (Vol. 15), 1961, pub. by Interscience Pub., N.Y. (QD. 271F57), page 487 relied on.

Primary Examiner—Anton H. Sutto
Assistant Examiner—L. A. Thaxton
Attorney, Agent, or Firm—Samuel L. Welt; Jon S. Saxe; George M. Gould

[57] ABSTRACT

The compound α-amino-3-phenyl propionic acid and ethane derivatives wherein the phenyl ring is substituted with a formyl group useful as a hypotensive and appetite inhibiting agent.

11 Claims, No Drawings

FORMYL-SUBSTITUTED TYROSINE

RELATED APPLICATIONS

This case is a continuation-in-part of co-pending application Ser. No. 139,297, filed Apr. 28, 1971 now U.S. Pat. No. 3,763,218.

SUMMARY OF THE INVENTION

In accordance with this invention, it has been discovered that compounds of the formula:

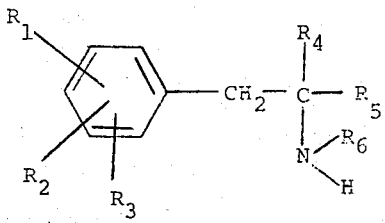

wherein one of $R_1$ or $R_2$ is formyl and the other of said $R_1$ or $R_2$ is hydroxy which can be either ortho or para to said formyl; $R_3$ and $R_4$ independently are hydrogen or lower alkyl; $R_5$ is hydrogen, carboxyl or lower alkoxy-carbonyl or mono or di-(lower alkyl) substituted amino carbonyl and $R_6$ is hydrogen, lower alkanoyl or aroyl;
as well as the salts and optical antipodes thereof are useful as hypotensive and appetite inhibiting agents.

The compounds of formula I can be prepared by formylating a compound of the formula:

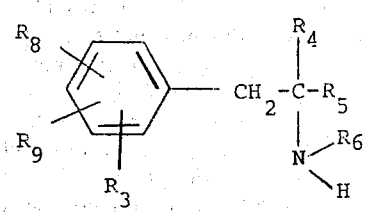

wherein
$R_3$, $R_4$, $R_5$ and $R_6$ are as above; $R_8$ and $R_9$ are ortho or para to each other, with one of $R_8$ and $R_9$ being hydrogen and the other of said $R_8$ or $R_9$ being hydroxy or lower alkoxy;
and salts and optical antipodes thereof.

DETAILED DESCRIPTION OF THE INVENTION

The term "lower alkyl" comprehends both straight and branched chain saturated hydrocarbon moieties having from 1 to 6 carbon atoms, such as methyl, ethyl, propyl, i-propyl, t-butyl, hexyl and the like, with methyl and ethyl being preferred. The term "lower alkoxy" comprehends moieties which can be designated —O—(lower alkyl), wherein lower alkyl is defined as above. Among the lower alkoxy moieties are included methoxy, ethoxy, propoxy, isopropoxy and the like, with methoxy and ethoxy being preferred.

The term "lower alkanoyl" comprehends residues of lower alkane carboxylic acids having from 1 to 6 carbon atoms such as acetyl, butyryl, caproyl and the like with acetyl being preferred.

The term "aroyl" includes aroyl moieties containing from 7 to 11 carbon atoms such as benzoyl or naphthoyl. The preferred aroyl radical is benzoyl.

The term "lower alkanoyloxy" designates lower alkanoyloxy groups wherein lower alkanoyl is defined as above. Among the preferred lower alkanoyloxy groups are acetyloxy, caproyloxy, etc., with acetyloxy being especially preferred.

The term "aroyloxy" designates aroyloxy groups wherein aroyl is defined as above. The preferred aroyloxy group is benzoyloxy.

The compounds of formula I and their salts are useful as blood pressure lowering agents and appetite inhibiting agents. These compounds also exhibit an action on circulation. The compounds of formula I above, as well as their salts, are used in the form of conventional pharmaceutical preparations which contain said compounds in connection with conventional pharmaceutical organic or inorganic materials suitable for internal administration. The pharmaceutical compositions containing the compounds of formula I above, as well as their salts can be administered parenterally or orally. Dosages can be adjusted to individual requirements, for example, these compounds can be administered in dosages of from about 1 mg/kg to about 100 mg/kg per day. These dosages can be administered in a single dosage form or in divided dosage forms. The pharmaceutical compositions can contain conventional organic or inorganic inert carrier materials such as water, gelatin, lactose, starch, magnesium stearate, talc, vegetable oils, gums, polyalkylene glycols, Vaseline or the like. The pharmaceutical preparations can be in conventional solid dosage forms such as tablets, dragees, suppositories, capsules or in conventional liquid dosage forms such as solutions, suspensions or emulsions. The pharmaceutical compositions can be submitted to conventional pharmaceutical expedients such as sterilization and/or can contain conventional pharmaceutical additives such as preservatives, stabilizing agents, wetting agents, emulsifying agents, salts for adjusting the osmotic pressure, buffers or the like. They also can contain other therapeutically useful materials.

The compounds of formula I above, in the form of their free acids are amphoteric in character. These compounds readily dissolve in water as well as in acid or in alkali in which they form salts.

In accordance with this invention, the compounds of formula I and their optical antipodes and pharmaceutically acceptable salts exhibit the aforementioned beneficial therapeutic properties. The compounds of formula I form pharmaceutically acceptable salts with both inorganic and organic pharmaceutically acceptable acids as well as bases. Among the acids which the compounds of formula I form pharmaceutically acceptable acid addition salts are included hydrochloric acid, hydrobromic acid, sulfuric acid, phosphoric acid, citric acid, acetic acid, succinic acid, maleic acid, methane sulfonic acid, p-toluene sulfonic acid and the like. Such acid addition salts are also within the scope of the invention.

The compounds of formula I also form pharmaceutically acceptable basic salts. Among the pharmaceutically acceptable basic salts of the compound of formula I are included the alkali metal salts such as sodium or potassium or the alkaline earth metal salts such as calcium.

The compounds of formula I above are practically nontoxic to vertebrates. For instance, these compounds, when administered orally to mice have an $LD_{50}$ of about 4,000 mg/kg. The effectiveness of these compounds as blood pressure reducing agents is seen by the fact that when 300 mg. of 3-formyl-L-tyrosine is administered p.o. to hypertonic rats within a 24-hour period, the blood pressure of the rats was reduced by 12%.

The compound of formula I can, if desired, be converted to dopa and analogs thereof which are useful anti-parkinson and blood pressure lowering agents by oxidative rearranging of the compound of the formula I via a Dakin or Baeyer-Villiger reaction to form a compound of the formula:

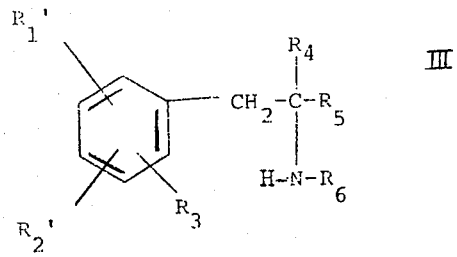

wherein
$R_4$, $R_5$ and $R_6$ are as above;
and $R_1'$ and $R_2'$ are ortho or para to each other; and one of $R_1'$ and $R_2'$ is

and the other is hydroxy.
The compound of formula III is then hydrolyzed to form dopa or analogs thereof.

Where the compound of formula III is a racemate and it is desired to obtain the dopa compound in its D or L form, the compound of formula III or its hydrolyzed product can be resolved. These racemates can be resolved into the optical antipodes by utilizing conventional methods of resolving. A particularly preferred method of resolving the compound of formula III or its hydrolyzation product is by the use of an optically active acid such as tartaric acid or an optically active base such as quinine or brucine.

In preparing dopa and its derivatives, it is generally preferred to use as a starting material, a compound of the formula I wherein the substitutents $R_1'$ and $R_2'$ are either in the 3- or 4-position and one of $R_1'$ and $R_2'$ is hydroxy and the other is formyl, $R_3$, $R_4$ and $R_6$ are hydrogen and $R_5$ is carboxyl or a lower alkoxy-carbon substituent.

The compound of formula I is converted to the compound of formula III by oxidizing the compound of the formula I with hydrogen peroxide or a derivative thereof. Any conventional derivative of hydrogen peroxide such as the organic or inorganic peroxides can be utilized in carrying out this reaction. Of the organic peroxides, the perorganic acids are generally utilized. Any conventional perorganic acid can be utilized in carrying out this reaction. Among the conventional perorganic acids which can be utilized are included peracetic acid, pertrifluoroacetic acid, m-chloroperbenzoic acid, or perphthalic acid, with peracetic acid being preferred. Any conventional inorganic peracid can be utilized. Among the conventional inorganic peracids which can be utilized, Caro's acid (permonosulfuric acid) and peroxydisulfuric acid are generally preferred. The especially preferred inorganic peracid in Caro's acid.

The conversion of the compounds of the formula I to compounds of the formula III can take place in water or in alkaline medium or in acidic medium. Hydrogen peroxide is conventionally employed in an alkali medium, especially in aqueous caustic soda. Peracetic acid is preferably employed in an acidic medium, preferably dilute acetic acid. On the other hand, Caro's acid is generally employed in water. In carrying out this oxidation reaction, temperature and pressure are not critical and this reaction can be carried out at room temperature and atmospheric pressure. However, if desired, higher or lower temperatures can be utilized. Generally, this reaction is carried out at a temperature of from 0°–70°C. When hydrogen peroxide or Caro's acid is utilized as the oxidizing agents, temperatures of from about 0°–50°C. are generally preferred. When peracetic acid is utilized as the oxidizing agents, temperatures of from about 0°–70°C. are generally preferred.

The formyloxy group in the compound of formula III can be converted to a hydroxy group by conventional hydrolysis or saponification procedures. This saponification procedure can be carried out by treating the compound of formula III with an aqueous acid or aqueous alkali at a temperature of below 30°C. If a basic medium is utilized, it is preferred to utilize aqueous sodium hydroxide or potassium hydroxide at room temperature.

Any lower alkanoyl or aroyl group denoted by the symbol $R_6$ which may have been present in the compounds of formula III remains unaffected by the saponification carried out utilizing temperatures below 30°C. to saponify the formyloxy group.

Any alkoxycarbonyl group denoted by the symbol $R_5$ which may be present is saponified in an alkaline medium under the conditions described in connection with the saponification of the formyloxy group. On the other hand, this alkoxycarbonyl group remains unaffected in an acidic medium under the aforementioned temperature conditions. In the latter connection, the alkoxycarbonyl group denoted by the symbol $R_5$ can be converted into the carboxy group by means of a dilute aqueous mineral acid at a temperature above 30°C, preferably at the boiling point of the mixture. Under the same conditions, any lower alkanoyl or aroyl group denoted by the symbol $R_6$ which may be present, can be split off.

The compounds of formula I and their salts are prepared by formylating a compound of the formula II or a salt thereof.

The compound of formula I so obtained wherein $R_5$ is a lower alkoxycarbonyl group can be converted into a compound of formula I where $R_5$ is carboxyl. The compound of formula I where $R_5$ is carboxyl can be esterified to form a compound of formula I wherein $R_5$ is lower alkoxycarbonyl. The compound of formula I where $R_6$ is lower alkanoyl or aroyl can be converted into a compound of formula I where $R_6$ is a hydrogen atom. If desired a free base or amino-acid of formula I can be converted into a salt. If desired, when the compound of formula I is a racemate, this racemate can be resolved into its optical antipodes.

The starting materials of formula II hereinbefore belong to a known class of compounds can be prepared according to known methods.

Especially useful starting materials of formula II are those which are present in L- or D,L-form. The preferred starting materials of formula II are those in which the symbol $R_3$ represents a hydrogen atom. Of these preferred starting materials, those in which one of the symbols $R_8$ and $R_9$ represents a hydrogen atom and the other symbol represents a hydroxy group are especially preferred.

Particularly preferred starting materials of formula II and particularly preferred products of formula I are summarized in the following Table.

Table

| Starting Maaterial | Product |
| --- | --- |
| N-Acetyl-3-(p-methoxy-phenyl)-L-alanine | N-Acetyl-3-formyl-L-tyrosine |
| N-Acetyl-3-(p-methoxy-phenyl)-L-alanine ethyl ester | N-Acetyl-3-formyl-L-tyrosine ethyl ester |

The aforementioned starting compounds can for example be converted into the desired end-products as follows:

N-Acetyl-3-(p-methoxy-phenyl)-L-alanine is reacted with a formylating agent, e.g., with dichloromethyl methyl ether and the obtained N-acetyl-3-(3-formyl-4-methoxy-phenyl)-L-alanine is converted into N-acetyl-3-formyl-L-tyrosine by reacting with a Lewis acid, e.g., with boron trifluoride. In analogous manner N-Acetyl-3-(p-methoxy-phenyl)-L-alanine ethyl ester can be formylated into N-acetyl-3-(3-formyl-4-methoxy-phenyl)-L-alanine ethyl ester which can be transformed into N-acetyl-3-formyl-L-tyrosine ethyl ester by reacting with water free aluminium chloride.

By reacting N-Acetyl-3-formyl-L-tyrosine ethyl ester with hydrochloric acid, 3-formyl-L-tyrosine hydrochloride is obtained.

The formylation in accordance with the process of this invention, which is effected with retention of the optical activity of the starting material used, in preferably carried out by reacting a starting material of formula II with a formylating agent in the presence of a Lewis acid or an inorganic or organic acid halide. Any conventional formylating agents can be utilized in carrying out this step. Especially suitable formylating agents are formic acid esters, orthoformic acid esters, formyl chloride (which may be formed in situ from carbon monoxide and hydrochloric acid), dihalomethyl lower alkyl ethers (especially dichloromethyl lower alkyl ethers such as dichloromethyl methyl ether), hydrocyanic acid, symmetrical triazine, dimethylformamide or other amides of formic acid. Among the preferred amides of formic acid are mono and dilower alkyl amides of formic acid. Also, when an ester of formic or orthoformic acid is utilized, the lower alkyl esters of formic acids or orthoformic acids are generally preferred.

Any conventional Lewis acid can be utilized in carrying out this conversion. Lewis acids which can expediently be used are zinc halides such as zinc chloride, aluminum halides such as aluminum chloride, titanium halides such as titanium tetrachloride, iron trihalides such as iron trichloride and tin halides such as tin tetrachloride. Halides of the most varied inorganic and organic acids (for example, phosphorus oxychloride and methanesulfochloride) can be used as the acid halide.

The formylation can be carried out in the absence of a further solvent when the formylating agent is used in excess. On the other hand, the formylation can also be carried out in the presence of an inert solvent; for example, in the presence of nitrobenzene, carbon tetrachloride, methylene chloride or chloroform. Any conventional inert organic solvent can be utilized, if desired, in carrying out this reaction. The temperature at which the formylation is carried out can vary within a very wide range. An especially suitable temperature at which to carry out the formylation is a temperature which lies at between about minus 50°C. and the reflux temperature of the mixture. This preferred temperature essentially depends on the nature of the substitution present on the phenyl ring of the starting material of formula II.

The compounds of formula I obtained after the formylation and, if necessary, transformation of a present lower alkoxy group $R_1$ or $R_2$ into the hydroxy group can, if desired, be subjected to the operations described hereinafter in any desired sequence, it being possible that several of these operations can proceed simultaneously.

A compound of formula I where $R_5$ is lower alkoxycarbonyl, can be converted into a compound of formula I where $R_5$ is carboxyl. This operation can be effected in conventional manner by saponification with an aqueous alkali or aqueous acid. Any conventional method of saponification can be utilized in carrying out this reaction.

A compound of formula I where $R_5$ is a carboxyl group can be esterified to form the compound of formula I where $R_5$ is a lower alkoxycarbonyl. This esterification can be carried out in a manner known per se with the usual esterification or amidation agents.

A compound of formula I where $R_6$ is a lower alkanoyl or aroyl group can be converted into a compound of formula I where $R_6$ is a hydrogen atom. This operation can be carried out according to saponification methods which are known per se.

A compound of formula I wherein one of $R_1$ or $R_2$ is a lower alkoxy group, can be converted into a compound of formula I wherein one of $R_1$ or $R_2$ represents a hydroxy group. This operation can be effected in a conventional manner by treatment with a Lewis acid (for example, aluminum chloride, boron trichloride or the like) or with hydrobromic acid.

Free amino-acids of formula I obtained are amphoteric. With bases, the carboxyl group of these compounds can form the corresponding salts. The amino group of the compounds of formula I is capable of forming acid addition salts. These salts can be obtained by reaction with inorganic and organic acids; for example, hydrochloric acid, sulfuric acid, phosphoric acid, acetic acid, oxalic acid, succinic acid or the like.

Racemates of formula I obtained can be resolved into their optical antipodes according to conventional methods; for example, with an optically active acid such as tartaric acid or an optically active base such as quinine or brucine.

The amines provided by the present invention (that is to say, the compounds of formula I and their salts), especially those which exist in the L- and D,L-form, display pharmacodynamic actions. They especially exhibit an action on the circulation. They can be used as hypotensive agents and as appetite-inhibiting agents.

The following examples are illustrative but not limitative of the invention. All temperatures are in degrees centigrade.

EXAMPLE 1

The process:

167 ml. of titanium tetrachloride are added with stirring in the course of 5 minutes to a solution of 100 g. of N-acetyl-3-(p-methoxy-phenyl)-L-alanine ethyl ester in 1,500 ml. of nitrobenzene, the temperature rising to 38°C. The mixture is cooled to +23°C. and then 69.4 ml. of dichloromethyl methyl ether are added in the course of 3 minutes. The mixture is then stirred at room temperature for 2 hours. The reaction solution is then cooled at +5° and poured with stirring into 380 ml. of ice-cold 3-N aqueous hydrochloric acid. 4,000 ml. of ethyl acetate and 2,000 ml. of tetrahydrofuran are added. The mixture is then neutralized by introduction of 1,200 g. of anhydrous potassium carbonate with stirring, and dried with sodium sulfate. After filtration, the mixture is evaporated (finally in high vacuum at 70°C.). The residue, dissolved in 500 ml. of methylene chloride, is applied to a chromatography column with 2,000 g. of Kieselgel. Elution with ethyl acetate-methylene chloride (1:1; v/v) yields, after evaporation, 75.6 g. of N-acetyl-3-(3-formyl-4-methoxyphenyl)-L-alanine ethyl ester which can be further purified by recrystallization from ethyl acetate-hexane; m.p. 100°–101°C; $[\alpha]_D^{25} = +24.0°$ ($c = 1.0$; in 95 percent ethanol).

A solution of 41.6 g. of N-acetyl-3-(3-formyl-4-methoxyphenyl)-L-alanine ethyl ester in 350 ml. of nitrobenzene is introduced in the course of 7 minutes at 25°C. into a solution of 166 g. of boron trichloride in 700 ml. of nitrobenzene. The reaction solution is stirred at 25°C. for 2 hours. 350 ml. of methylene chloride are then added and 350 ml. of water are added dropwise with cooling in the course of 30 minutes at +5°C. The mixture is filtered, the filter residue is rinsed with methylene chloride, the methylene chloride phase in the filtrate is separated off and the aqueous phase is extracted again with methylene chloride. The organic phases are combined, washed with aqueous sodium bicarbonate solution, dried and evaporated (finally in high vacuum at 70°C). By recrystallization of the crystalline residue from ethyl acetate-hexane there are obtained 21-8 g. of pure N-acetyl-3-formyl-L-tyrosine ethyl ester; melting point 117°–118°C; $[\alpha]_D^{25} = +15.8°$ (c = 1.0; in 95 percent ethanol).

Preparation of the staring material:

160 g N-acetyl-3-(p-methoxy-phenyl)-L-alanine were dissolved in 1,600 ml. of absolute ethanol. The above solution was saturated with dry hydrogen chloride gas. The temperature of the solution was kept at 20° to 22°C. by cooling. After this the reaction mixture was evaporated to dryness. The residue was taken up in ethyl acetate. The extract was washed in saturated aqueous sodium bicarbonate solution, dried over sodium sulfate and evaporated to dryness under vacuum. The resulting N-acetyl-3-(p-methoxy-phenyl)-L-alanine-ethyl ester after crystallization from hexane ethyl acetate solvent mixture has a melting point of 93° to 94°C.

EXAMPLE 2

A solution of 2.67 g. of anhydrous aluminum chloride and 1.46 g. of N-acetyl-3-(3-formyl-4-methoxyphenyl)-L-alanine ethyl ester in 20 ml. of nitrobenzene is stirred at 90°–92°C. for 1 hour. The mixture is then introduced into a mixture of 20 g. of ice and 3 ml. of concentrated hydrochloric acid and extracted three times with 300 ml. of ethyl acetate each time. The carboxylic acid is isolated from the extracts with sodium bicarbonate solution which is subsequently acidified and again extracted with ethyl acetate. Drying of the ethyl acetate extract, evaporation and recrystallization of the residue from a mixture of ethyl acetate and hexane yields pure N-acetyl-3-formyl-L-tyrosine of melting point 133°–134°C.

EXAMPLE 3

A mixture of 30.0 g. of N-acetyl-3-formyl-L-tyrosine ethyl ester and 715 ml. of 3-N-hydrochloric acid is heated at reflux in an argon atmosphere with stirring for 2 hours, then evaporated to dryness under reduced pressure. By recrystallization of the residue from 300 ml. of 18 percent hydrochloric acid with the addition of active charcoal there are obtained 16.0 g. of pure 3-formyl-L-tyrosine hydrochloride which does not melt up to 350°; $[\alpha]_D = -5.5$ (c = 1.0 percent; in water).

EXAMPLE 4

In analogous manner as described in Example 1, there can be obtained:

N-Acetyl-α-methyl-3-formyl-L-tyrosine methyl ester; Fp.: 117°–118°C.

starting from:
N-Acetyl-2-methyl-3-(p-methoxy-phenyl)-L-alanine-methyl ester,
and proceeding via the intermediates:
N-Acetyl-2-methyl-3-(3-formyl-4-methoxy-phenyl)-L-alanine methyl ester.
D,L-N-benzoyl-3-(3-formyl-4-hydroxy -5- methylphenyl)-alanine; Fp.: 200°–202°C.

starting from:
D,L-N-benzoyl-3-(p-methoxy-m-methyl-phenyl)-alanine,
and proceeding via the intermediates:
—D,L-N-benzoyl-3-(3-formyl-4-hydroxy-5-methylphenyl)-alanine.
5-(2-aminoethyl)-salicylic aldehyde; Fp.: 173°–176°C.

from:
p-hydroxy-phenethylamine.
D,L-4-formyl-tyrosine, Fp.: >250°C., from:
D,L-3-hydroxy-phenylalanine.
D,L-3-formyl-α, 5-dimethyl-tyramine, from:
D,L-α-methyl-p-hydroxy-m-methyl-phenethylamine.
3-formyl-4-hydroxy-5-methyl-phenyl-alanine; Fp.: 150°C., [hydrochloride].

from:
α-methyl-p-hydroxy-m-methyl-phenylalanine.

EXAMPLE 5

In analogous manner as described in Example 3, there can be obtained:
D,L-3-formyl-5-methyl-tyrosine; Fp.: >300°C.
from:

D,L-N-benzoyl-3-(3-formyl-4-hydroxy-5-methylphenyl)-alanine.
3-formyl-α-methyl-L-tyrosine,
Fp.: >350°C., [hydrochloride].
from:
N-acetyl-α-methyl-3-formyl-L-tyrosine methyl ester.

EXAMPLE 6

A solution of 104 g. of D,L-(α-methyl-p-methoxy-phenethyl)formamide and 98 ml. of dichloromethyl-methyl ether in 2,200 ml. of nitrobenzene is treated dropwise at 20° to 25°C. with stirring and cooling with 236 ml. of titane tetrachloride. The mixture is stirred for one hour at 25°C., then cooled at 5°C. and poured into a mixture of 80 ml. concentrated hydrochloric acid, 250 g. of ice and 4,000 ml. ethyl acetate, made alkaline with a 50% aqueous solution of potassium carbonate and extracted with ethyl acetate. After evaporation under reduced pressure, the remaining D,L-N-(α-methyl-3-formyl-4-methoxy-phenethyl)-formamide melts after recrystallization from ethyl acetate/hexane at 97°–98°C.

6.2 g. of D,L-N-(α-methyl-3-formyl-4-methoxy-phenethyl)-formamide are diluted with 70 ml. of nitrobenzene. The resulting solution is mixed with stirring with a solution of 33 g. of boron trichloride in 140 ml. of nitrobenzene. The mixture is stirred for 2 hours at 25°C., then cooled to 2°C. and poured into a mixture of 160 g. of ice and 25 ml. of ethyl acetate. The aqueous phase is extracted with ethyl acetate. The combined ethyl acetate extracts are dried and evaporated under reduced pressure. The remaining D,L-N-(α-methyl-3-formyl-4-hydroxy-phenethyl)formamide melts, after purification by adsorption on silica gel and after recrystallization from ethyl acetate/hexane, at 95°–97°C.

EXAMPLE 7

1 g. of D,L-N-(α-methyl-3-formyl-4-hydroxy-phenethyl)-formamide and 17 ml. of 3 n hydrochloric acid are treated for 10 minutes under reflux conditions at boiling temperature and then evaporated under reduced pressure. The remaining D,L-5-(α-aminopropyl)-salicyclic aldehyde hydrochloride melts after recrystallization from 25% hydrochloric acid at 178°C. [Dec.].

EXAMPLE 8

In analogous manner as described in Example 6, there can be obtained:
D,L-N-(α-ethyl-4-formyl-3-hydroxy-phenethyl)-formamide; Fp.: 85°–86°C.
starting from:
D,L-N-(α-ethyl-4-formyl-3-methoxy-phenethyl)-formamide
and proceeding via the intermediates:
D,L-N-(α-ethyl-4-formyl-3-methoxy-phenethyl)-formamide.
N-(4-formyl-3-hydroxy-phenethyl)-benzamide; Fp.: 116°–117°C.
starting from:
N-(m-methoxy-phenethyl)-benzamide and proceeding via the intermediates:
N-(4-formyl-3-methoxy-phenethyl)-benzamide.

EXAMPLE 9

In analogous manner as described in Example 7, there can be obtained:
4-(2-amino-ethyl)-salicylic aldehyde;
from: N-(4-formyl-3-methoxy-phenethyl)-benzamide.
D,L-4-(2-amino-butyl)-salicylic aldehyde hydrochloride;
Fp.: 165°C., [Dec.],
from: D,L-4-(α-ethyl-4-formyl-3-hydroxy-phenethyl)-formamide.

EXAMPLE 10

Manufacture of tablets of the following composition:

| | |
|---|---|
| N-acetyl-3-formyl-L-tyrosine ethyl ester | 100 mg. |
| Lactose | 61 mg. |
| Corn starch | 30 mg. |
| Polyvinylpyrrolidone | 4 mg. |
| Talcum | 5 mg. |

The active substance is mixed with the lactose and the corn starch and, after addition of a solution of polyvinylpyrrolidone in 40 ml. of ethanol, granulated. The granulate is dried at 30°C., mixed with talcum and pressed to tablets.

| | |
|---|---|
| Individual weight of one tablet | 200 mg. |
| Active substance content of one tablet | 100 mg. |

We claim:
1. A compound selected from the group consisting of compounds of the formula:

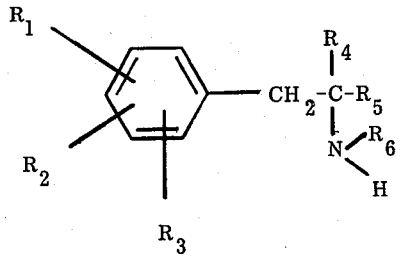

wherein one of $R_1$ or $R_2$ is formyl and the other of said $R_1$ or $R_2$ is hydroxy, which can be either ortho or para to said formyl; $R_3$ and $R_4$ are independently hydrogen or lower alkyl; $R_5$ is carboxyl and $R_6$ is hydrogen, lower alkanoyl, benzoyl or naphthoyl
and pharmaceutically acceptable salts thereof.
2. The compound of claim 1 which is in L-form.
3. The compound of claim 2 which is N-acetyl-3-formyl-L-tyrosine.
4. The compound of claim 2 which is 3-formyl-L-tyrosine.
5. The compound of claim 2 which is 3-formyl-α-methyl-L-tyrosine.
6. The compound of claim 1 which is in the D,L-form.
7. The compound of claim 6 which is D,L-N-benzoyl-3-(3-formyl-4-hydroxy-5-methyl-phenyl)-alanine.
8. The compound of claim 6 which is D,L-4-formyltyrosine.

9. The compound of claim 6 which is D,L-3-formyl-5-methyltyrosine.

10. The compound of claim 1 which is 3-formyl-4-hydroxy-5-methyl-phenylalanine.

11. A process for producing a compound of the formula:

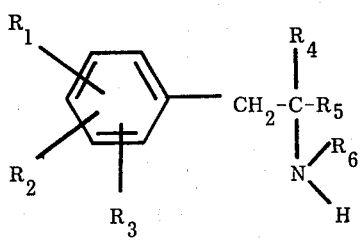

wherein one of $R_1$ or $R_2$ is formyl and the other of said $R_1$ or $R_2$ is hydroxy, which can be either ortho or para to said formyl; $R_3$ and $R_4$ are independently hydrogen or lower alkyl; $R_5$ is hydrogen, carboxyl or lower alkoxy carbonyl; and $R_6$ is hydrogen, lower alkanoyl or aroyl;

and pharmaceutically acceptable salts thereof comprising formylating a compound of the formula;

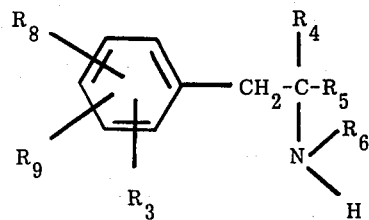

wherein $R_3$, $R_4$, $R_5$ and $R_6$ are as above; $R_8$ and $R_9$ are ortho or para to each other, with one of $R_8$ or $R_9$ being hydrogen and the other of said $R_8$ or $R_9$ being hydroxy or lower alkoxy and pharmaceutically acceptable salts thereof with a formylating agent selected from the group consisting of formic acid esters, ortho formic acid esters, formyl chloride, dihalo methyl lower alkyl esters, hydrocyanic acid, symmetrical triazine and amides of formic acid in the presence of a Lewis acid at a temperature in the range of from about −50°C. to the reflux temperature of the reaction medium.

* * * * *